(12) United States Patent
Park

(10) Patent No.: US 12,712,213 B2
(45) Date of Patent: Aug. 18, 2026

(54) BATTERY PACK

(71) Applicant: Samsung SDI Co., Ltd., Yongin-si (KR)

(72) Inventor: Sang Hun Park, Yongin-si (KR)

(73) Assignee: Samsung SDI Co., Ltd., Gyeonggi-do (KR)

( * ) Notice: Subject to any disclaimer, the term of this patent is extended or adjusted under 35 U.S.C. 154(b) by 779 days.

(21) Appl. No.: 18/177,328

(22) Filed: Mar. 2, 2023

(65) Prior Publication Data

US 2023/0282893 A1 Sep. 7, 2023

(30) Foreign Application Priority Data

Mar. 3, 2022 (KR) ........................ 10-2022-0027624

(51) Int. Cl.
*H01M 10/42* (2006.01)
*H01M 50/204* (2021.01)
*H01M 50/531* (2021.01)

(52) U.S. Cl.
CPC ....... *H01M 10/425* (2013.01); *H01M 50/204* (2021.01); *H01M 50/531* (2021.01); *H01M 2220/30* (2013.01)

(58) Field of Classification Search
CPC ............. H01M 10/425; H01M 50/531; H01M 50/204; H01M 2220/30
USPC .................................................. 429/92; 29/2
See application file for complete search history.

(56) References Cited

U.S. PATENT DOCUMENTS 4,920,019 A * 4/1990 Stoklosa ............. H01M 50/284 429/158
10,350,872 B2 7/2019 Ishimatsu
10,589,502 B2 3/2020 Ishimatsu
11,670,803 B2 6/2023 Park
2011/0281140 A1* 11/2011 Lee ..................... H01M 50/528 429/7

(Continued)

FOREIGN PATENT DOCUMENTS

JP 1998-083722 A 3/1998
JP 2014135166 A * 7/2014 .............. H01M 2/02

(Continued)

OTHER PUBLICATIONS

Notice of Opinion Submission dated Apr. 25, 2024 in corresponding Korean patent application No. 10-2022-0027624, 8 pp.

*Primary Examiner* — Patricia L. Hailey
(74) *Attorney, Agent, or Firm* — Knobbe, Martens, Olson & Bear, LLP

(57) ABSTRACT

A battery pack is proposed. The battery pack may include an electrode assembly and a protective circuit module including a circuit board having an intaglio electrically connected to a conductive pattern formed on a plate surface, and a tab connector electrically connected to a first electrode tab and a second electrode tab, respectively. The tab connector is electrically connected to the circuit board on the intaglio. When the electrode tabs and the tab connector are brought into contact with an anisotropic conductive film, conduction of conductive balls can be made at the intaglio of the tab connector. Therefore, even if the compressed surface is non-uniform, stable resistance and electrical connection can be provided by minimizing resistance distribution due to height imbalance of the anisotropic conductive film.

15 Claims, 6 Drawing Sheets

(56) References Cited

U.S. PATENT DOCUMENTS

| | | | | |
|---|---|---|---|---|
| 2012/0208047 | A1* | 8/2012 | Park | H01M 10/425 429/7 |
| 2014/0120401 | A1 | 5/2014 | Shin et al. | |
| 2014/0360757 | A1 | 12/2014 | Gao et al. | |
| 2015/0208511 | A1 | 7/2015 | Ishimatsu | |
| 2019/0308403 | A1 | 10/2019 | Ishimatsu | |
| 2020/0127258 | A1* | 4/2020 | Lim | H01M 50/204 |
| 2020/0373544 | A1* | 11/2020 | Park | H01M 10/42 |
| 2020/0381696 | A1* | 12/2020 | Park | B23K 26/21 |
| 2021/0203031 | A1* | 7/2021 | Park | H01M 50/543 |
| 2023/0216158 | A1* | 7/2023 | Park | H01M 10/425 |

FOREIGN PATENT DOCUMENTS

| | | | | | |
|---|---|---|---|---|---|
| KR | 20070068848 | A | * | 7/2007 | H01M 10/052 |
| KR | 10-2014-0055918 | A | | 5/2014 | |
| KR | 10-1631130 | B1 | | 6/2016 | |
| KR | 10-2019-0050688 | A | | 5/2019 | |
| KR | 10-2019-0082549 | A | | 7/2019 | |
| KR | 10-2089738 | B1 | | 3/2020 | |

* cited by examiner

BATTERY PACK

CROSS-REFERENCE TO RELATED APPLICATION

This application is based on and claims priority under 35 U.S.C. § 119 to Korean Patent Application No. 10-2022-0027624, filed on Mar. 3, 2022, in the Korean Intellectual Property Office, the disclosure of which is incorporated by reference herein in its entirety.

BACKGROUND

1. Field

An embodiment of the present disclosure relates to a battery pack.

2. Description of the Related Technology

In general, an electronic device (e.g., a notebook computer, a mini notebook computer, a net book, a mobile computer, an ultra-mobile personal computer (UMPC), or a portable multimedia player (PMP)), utilizes a battery pack having a plurality of battery cells connected in series and/or in parallel to form a portable power source. The battery pack includes a protective circuit module (PCM) for protecting battery cells from over-charging, over-discharging, and/or over-current, and the battery cells and the protective circuit module may be incorporated in a case together.

The above information disclosed in this Background section is only for enhancement of understanding of the background of the disclosure and therefore it may contain information that does not constitute prior art.

SUMMARY

An embodiment of the present disclosure provides a battery pack capable of providing stable electrical connection between a protective circuit module and an electrode tab.

In addition, an embodiment of the present disclosure provides a battery pack capable of providing stable resistance by ensuring the flatness of a compressed surface when an electrode tab and tab connection part of a protective circuit module are connected by an anisotropic conductive film.

A battery pack according to an embodiment of the present disclosure may include: an electrode assembly and a battery cell having a first electrode tab and a second electrode tab electrically connected to the electrode assembly; and a protective circuit module including a circuit board having an intaglio part electrically connected to a conductive pattern formed on a plate surface, and a tab connection part electrically connected to the first electrode tab and the second electrode tab, respectively, to electrically connect the first electrode tab and the second electrode tab to the circuit board, wherein the tab connection part is electrically connected to the circuit board on the intaglio part.

The tab connection part may include an insulation plate made of an insulating material disposed between the first electrode tab and the second electrode tab and the circuit board, and an anisotropic conductive film disposed between the insulation plate and the circuit board and including a plurality of conductive balls.

A penetration part may be formed through the insulation plate at a position corresponding to the intaglio part.

The intaglio part may have a planar shape having a preset area.

The intaglio part may be formed repeatedly in a preset pattern.

The intaglio part may have a depth of 30-80% of the diameter of the conductive balls.

The thickness of the anisotropic conductive film before compression may be greater than the thickness of the insulation plate.

In addition, an embodiment of the present disclosure provides a battery pack including a battery cell including an electrode assembly and a first electrode tab and a second electrode tab electrically connected to the electrode assembly; and a protective circuit module including a circuit board having an intaglio part concavely formed on one side, an insulation plate made of an insulating material disposed to face one-side surfaces of the first electrode tab and the second electrode tab, and a tab connection part disposed between the insulation plate and the circuit board and including a plurality of conductive balls, wherein the insulation plate has formed therethrough a penetration part communicating with the intaglio part, and the first electrode tab and the second electrode tab are electrically connected to the circuit board in regions of the intaglio part and the penetration part.

The intaglio part may be formed repeatedly in a preset pattern.

The intaglio part may have a depth of 30-80% of the diameter of the conductive balls.

Another embodiment of the present disclosure provides a battery pack comprising: an electrode assembly and a battery cell, the battery cell comprising a first electrode tab and a second electrode tab electrically connected to the electrode assembly; and a protective circuit module including a circuit board and a tab connector, the circuit board comprising an intaglio electrically connected to a conductive pattern formed on a plate surface, the tab connector electrically connected to the first electrode tab and the second electrode tab, respectively, to electrically connect the first electrode tab and the second electrode tab to the circuit board, wherein the tab connector is electrically connected to the circuit board on the intaglio.

The tab connector may comprise an insulation plate and an anisotropic conductive film, the insulation plate may include an insulating material disposed between the circuit board and each of the first electrode tab and the second electrode tab, the anisotropic conductive film may be disposed between the insulation plate and the circuit board, the anisotropic conductive film may include a plurality of conductive balls.

An opening may be formed through the insulation plate at a position corresponding to the intaglio.

The intaglio may have a planar shape having a preset area.

The intaglio may be formed repeatedly in a preset pattern.

The intaglio may have a depth of about 30%-80% of the diameter of the conductive balls.

The opening may have a shape corresponding to the shape of the intaglio.

The thickness of the anisotropic conductive film before compression may be greater than the thickness of the insulation plate.

Still another embodiment of the present disclosure provides a battery pack comprising: a battery cell including an electrode assembly and a first electrode tab and a second electrode tab electrically connected to the electrode assembly; and a protective circuit module including a circuit board, an insulation plate, and a tab connector, the circuit board comprising an intaglio concavely formed on one side, the insulation plate including an insulating material disposed to face one-side surface of each of the first electrode tab and the second electrode tab, and the tab connector disposed between the insulation plate and the circuit board, the tab connector including a plurality of conductive balls, wherein the insulation plate comprises an opening communicating with the intaglio, and wherein the first electrode tab and the second electrode tab are electrically connected to the circuit board in regions of the intaglio and the opening.

The intaglio may be formed repeatedly in a preset pattern.

The intaglio may have a depth of about 30%-80% of the diameter of the conductive balls.

The intaglio may have a curved shape.

The intaglio may have a lattice shape.

The intaglio may comprise a plurality of diagonal holes formed at regular intervals.

The opening may have a shape corresponding to the shape of the intaglio.

DETAILED DESCRIPTION

Figure 1:
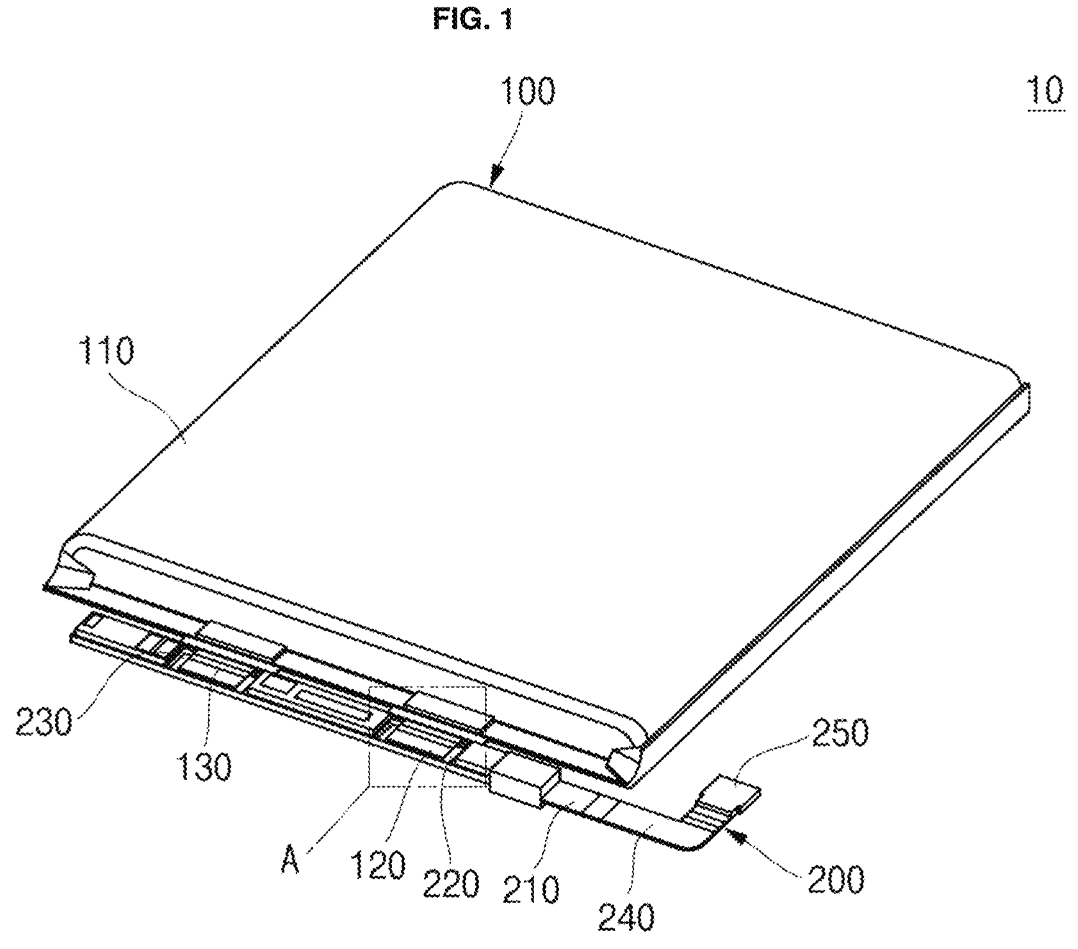
FIG. 1 is a perspective view illustrating a battery pack according to an embodiment of the present disclosure.

The protective circuit module may be bonded and electrically connected to a metal tab of a battery cell by an anisotropic conductive film (ACF). However, when such an ACF is applied to a material that is thin and has a sufficient hardness, it is difficult to secure a stable resistance connection because it is not easy to ensure that the crimping surface is sufficiently flat.

Embodiments of the present disclosure are provided to more fully describe the present disclosure to those skilled in the art, and the following embodiments may be embodied in many different forms and should not be construed as being limited to the example embodiments set forth herein. Rather, these example embodiments are provided so that this disclosure will be thorough and complete and will convey the aspects and features of the present disclosure to those skilled in the art.

In addition, in the accompanying drawings, sizes or thicknesses of various components may be exaggerated for brevity and clarity. Like numbers refer to like elements throughout. As used herein, the term "and/or" includes any and all combinations of one or more of the associated listed items. In addition, it will be understood that when an element A is referred to as being "connected to" an element B, the element A can be directly connected to the element B or an intervening element C may be present therebetween such that the element A and the element B are indirectly connected to each other.

The terminology used herein is for the purpose of describing particular embodiments only and is not intended to be limiting of the disclosure. As used herein, the singular forms are intended to include the plural forms as well, unless the context clearly indicates otherwise. It will be further understood that the terms "comprise," "include," "comprising" and/or "including," when used in this specification, specify the presence of stated features, numbers, steps, operations, elements, and/or components, but do not preclude the presence or addition of one or more other features, numbers, steps, operations, elements, components, and/or groups thereof.

It will be understood that, although the terms first, second, etc. may be used herein to describe various members, elements, regions, layers and/or sections, these members, elements, regions, layers and/or sections should not be limited by these terms. These terms are only used to distinguish one member, element, region, layer and/or section from another. Thus, for example, a first member, a first element, a first region, a first layer and/or a first section discussed below could be termed a second member, a second element, a second region, a second layer and/or a second section without departing from the teachings of the present disclosure.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the element or feature in the figures is turned over, elements described as "below" or "beneath" other elements or features would then be oriented "on" or "above" the other elements or features. Thus, the exemplary term "below" can encompass both an orientation of above and below.

Hereinafter, a battery pack according to an embodiment of the present disclosure will be described in detail with reference to the accompanying drawings.

Figure 2:
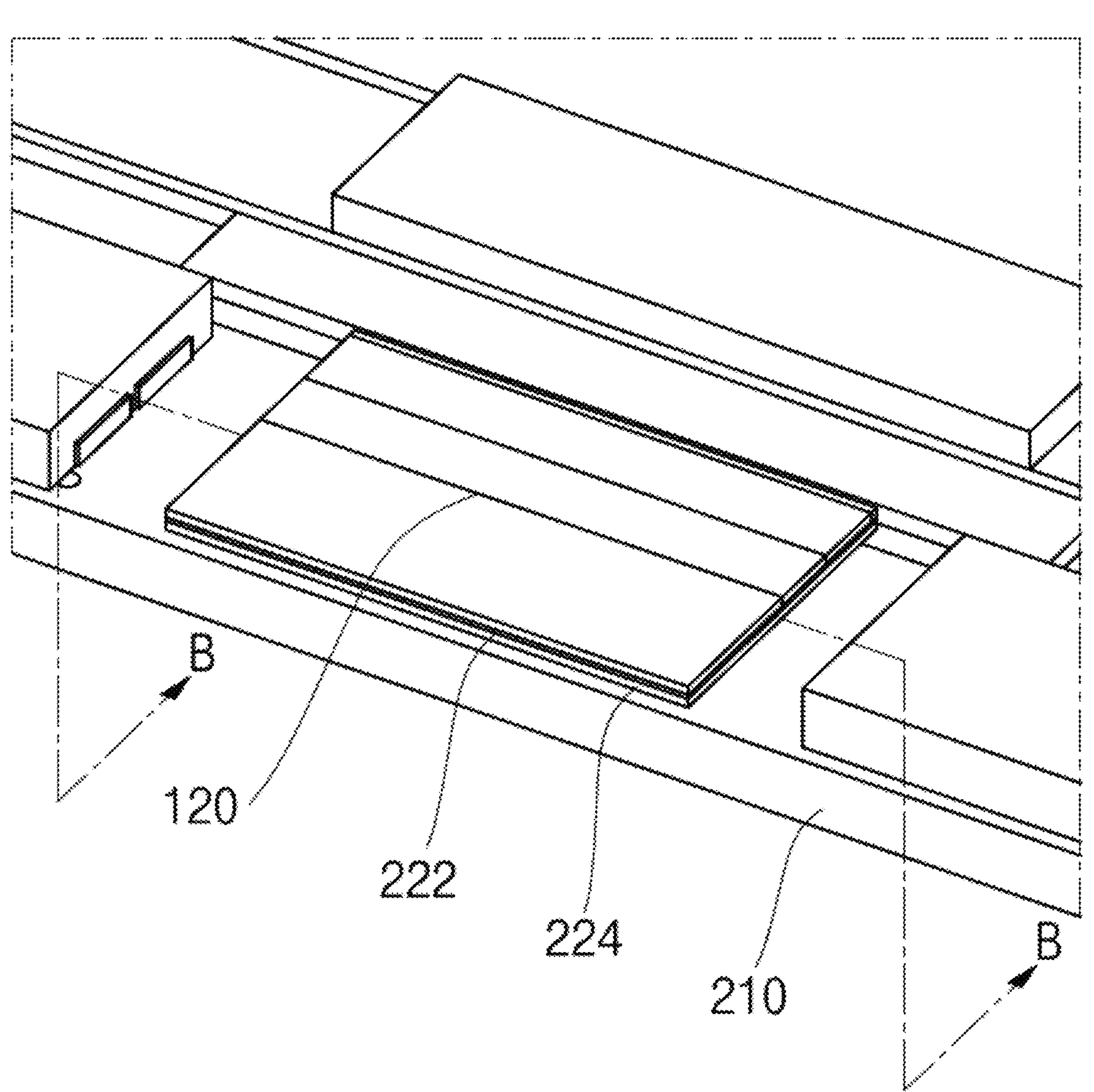
FIG. 2 is an enlarged perspective view of part A of FIG. 1.
Figure 3:
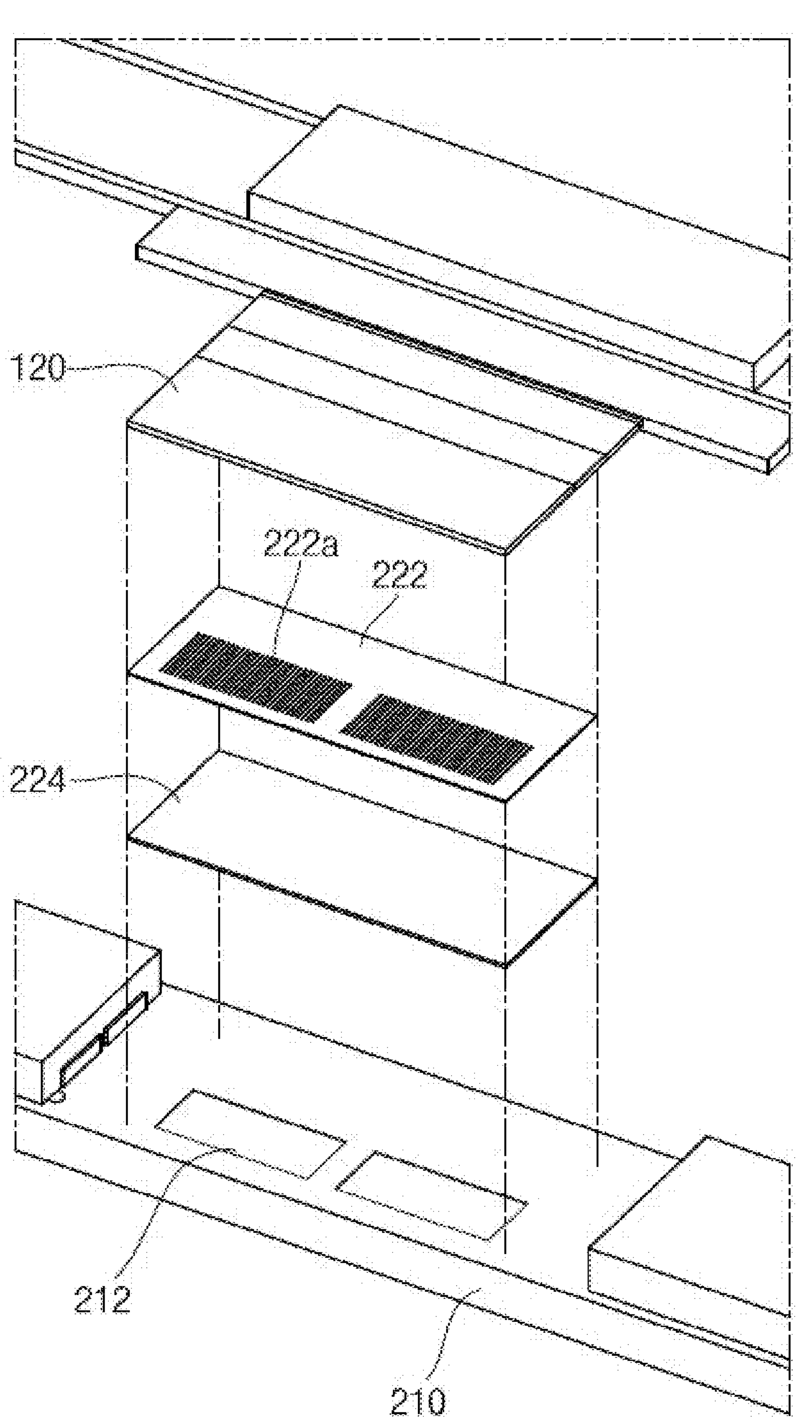
FIG. 3 is an exploded perspective view of part A according to FIG. 2.
Figure 4:
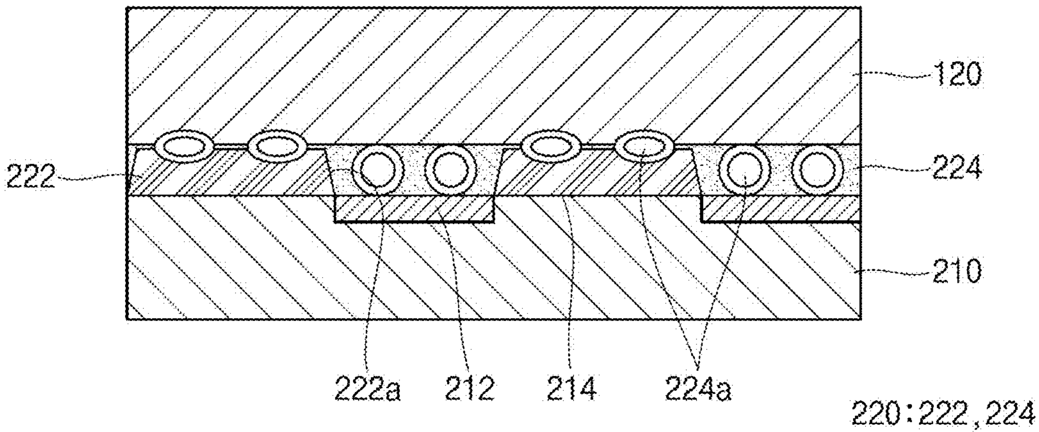
FIG. 4 is a cross-sectional view taken along line B-B of FIG. 2.

FIG. 1 is a perspective view illustrating a battery pack 10 according to an embodiment of the present disclosure. FIG. 2 is an enlarged perspective view of part A of FIG. 1. FIG. 3 is an exploded perspective view of part A according to FIG. 2. FIG. 4 is a cross-sectional view taken along line B-B of FIG. 2.

As shown in FIG. 1, the battery pack 10 may include a battery cell 100 and a protective circuit module 200. Although not shown in the drawing, the battery pack 10 may include a frame surrounding the battery cell 100 and the protective circuit module 200, an insulating tape, and the like.

The battery cell 100 may include a case 110 accommodating an electrode assembly therein, and a first electrode tab 120 and a second electrode tab 130 electrically connected to the electrode assembly.

The electrode assembly may be formed by stacking or winding a first electrode plate forming a positive electrode plate, a second electrode plate forming a negative electrode plate, and a separator interposed therebetween. The electrode assembly is sealed after being accommodated in the case 110 together with an electrolyte. As a non-limiting example, the case 110 may be in the form of a pouch, but is not limited thereto. The first electrode plate and the second electrode plate are respectively electrically connected to the first electrode tab 120 and the second electrode tab 130. The first electrode tab 120 and the second electrode tab 130 protrude to one side of the case 110. For convenience, the direction in which the first electrode tab 120 and the second electrode tab 130 are exposed is referred to as the front side of the case 110. The first electrode tab 120 and the second electrode tab 130 may be metal plates having a flat plate shape and having a predetermined size. Tab connection parts 220 and 230 (also referred to as "connectors") to be described later are respectively connected to the lower surfaces of the first electrode tab 120 and the second electrode tab 130.

As shown in FIGS. 1 and 2, the protective circuit module 200 may include a circuit board 210, a tab connection part 220, a flexible circuit board 240, and a connector 250.

The circuit board 210 may have a plate shape with a surface on which an intaglio part 212 (see FIG. 4, also referred to as an "intaglio" or "etching") is formed. The circuit board 210 serves to prevent over-charging, over-discharging, and/or over-current of the battery cell 100. To this end, at least one electronic component such as a positive temperature device (PTC) may be mounted on the circuit board 210. The circuit board 210 may be electrically connected to the first electrode tab 120 and the second electrode tab 130 by tab connection parts 220 and 230, respectively. The flexible circuit board 240 may be connected to one side of the circuit board 210 so as to be electrically connected thereto. The connector 250 configured to be connected to an external device may be mounted on the flexible printed circuit board 240. Although not shown in the drawing, the connector 250 may be exposed to the outside of the frame of the battery pack 10.

Hereinafter, the structures of the tab connection part described above and an electrical connection structure between the protective circuit module and the battery cell will be described in more detail.

As shown in FIG. 1, a pair of tab connection parts 220 and 230 are disposed on the circuit board 210, and the first electrode tab 120 and the second electrode tab 130 are respectively connected to the tab connection parts 220 and 230. Hereinafter, for convenience, the description will be made based on the first tab connection part 220 connected to the first electrode tab 120. The second tab connection part 230 connected to the second electrode tab 130 may have substantially the same structure as the first tab connection part 220 connected to the first electrode tab 120.

As shown in FIGS. 2 to 4, the intaglio part 212 may be electrically connected to a plurality of conductive patterns and may be formed on the circuit board 210. The intaglio part 212 may include a planar area concavely formed (e.g., engraved or incised) in the planar surface (top surface with reference to FIG. 3) of the circuit board 210 and is electrically connected to a conductive pattern (not shown). The intaglio part 212 may be formed in a rectangular shape on a predetermined area, or may have a shape in which a pattern of a specific shape is repeatedly formed (e.g., a concavo-convex structure). As non-limiting example, when the intaglio part 212 has a shape in which a specific pattern is repeatedly formed, an embossed portion 214 (see FIG. 4) having a relatively higher upper surface than the intaglio part 212 may be provided between patterns of the intaglio part 212. FIG. 3 shows the shape of the intaglio part 212, which is a quadrangular shape, as a non-limiting example. The first tab connection part 220 may be connected to the first electrode tab 120 after being contacted and connected to the circuit board 210. Here, the first tab connection part 220 is electrically connected to the intaglio part 212 to electrically connect the circuit board 210 and the first electrode tab 120. The first tab connection part 220 may include an insulation plate 222 and an anisotropic conductive film (ACF) 224.

As shown in FIGS. 3 and 4, the insulation plate 222 has a plate shape and may be made of or include an insulating material. The insulation plate 222 may be sized to correspond to the size of the first electrode tab 120 or smaller than the size of the first electrode tab 120. The insulation plate 222 may be shaped and sized corresponding to the anisotropic conductive film 224. A penetration part **222*a* (also referred to as an "opening" or "hole") shaped and sized corresponding to the intaglio part 212 may be formed through the insulation plate 222. For example, the penetration part 222*a* may be formed only on a region corresponding to the region of the circuit board 210 where the intaglio part 212** is formed.

As a non-limiting example, the penetration part **222*a* may have a shape in which a plurality of straight-line patterns are arranged at regular intervals. For example, the penetration part 222*a* may have the same shape as or a different shape from the intaglio part 212. Since the penetration part 222*a* is formed through the insulation plate 222 and the penetration part 222*a* communicates with the intaglio part 212, conduction with the anisotropic conductive film 224 can be achieved only in the region where the penetration part 222*a*** is formed.

As shown in FIGS. 3 and 4, the anisotropic conductive film 224 is in the form of a film having a predetermined thickness in which a plurality of conductive balls **224*a* are distributed in a resin. The anisotropic conductive film 224 adheres the first electrode tab 120 and the first tab connection part 220, and electrically connects the intaglio part 212 of the circuit board 210 and the first electrode tab 120. The anisotropic conductive film 224 may be sized and/or shaped to correspond to the insulation plate 222. For example, the anisotropic conductive film 224 may be composed of or include polymeric conductive balls 224*a*** in an acrylic binder.

The conductive balls **224*a* are in forms of balls in which a metal material such as gold (Au), nickel (Ni), or palladium (Pd) is coated with a polymer. When pressure and heat are applied to the anisotropic conductive film 224, the conductive balls 224*a* included in the resin collide with each other due to the pressure, the polymer coating is peeled off, and the metal material inside the polymer is melted. The upper and lower surfaces of the anisotropic conductive film 224 are conducted by the metal material of the molten conductive balls 224*a*, and thus the anisotropic conductive film 224 becomes conductive. In this principle, the first electrode tab 120 and the first tab connection part 220 are conductive by the anisotropic conductive film 224. However, as described above, the first electrode tab 120 is attached to the anisotropic conductive film 224 with the insulation plate 222 interposed therebetween. Therefore, as shown in FIG. 4, in a region where the penetration part 222*a* is not formed, even if the anisotropic conductive film 224 becomes conductive, the first electrode tab 120 and the intaglio part 212 cannot be conducted. In contrast, in the region where the penetration part 222*a* is formed, the conductive balls 224*a* are disposed within the intaglio part 212 and the penetration part 222*a*, and thus, when the anisotropic conductive film 224 becomes conductive, the intaglio part 212 of the circuit board 210 and the first electrode tab 120** may be conducted.

Since the anisotropic conductive film 224 becomes conductive only when heat and pressure are applied to the anisotropic conductive film 224, the first electrode tab 120 and the circuit board 210 are compressed by applying heat when connected by the tab connection part 220. The thickness of the anisotropic conductive film 224 before compression may be greater than that of the insulation plate 222. While being compressed, the conductive balls **224*a* mostly move to the region of the intaglio part 212 area, and thus the anisotropic conductive film 224 may be compressed to have a thickness slightly greater than or corresponding to the thickness of the insulation plate 222. When maximally compressed, the anisotropic conductive film 224 may be compressed to have a thickness corresponding to the thickness of the insulation plate 222. Since the compression thickness of the anisotropic conductive film 224 may not be less than the thickness of the insulation plate, the anisotropic conductive film 224 may have a substantially uniform compression thickness and a flat compressed surface. Therefore, the flatness of the anisotropic conductive film 224 can be achieved. Here, since the intaglio part 212 may have a depth that can conduct after the anisotropic conductive film 224 is compressed, the depth of the intaglio part 212 may be about 30% to 80% of the diameter of the uncompressed conductive balls 224***a*. For example, the conductive balls 224*a* may have a size in the range of 3 micrometers to 80 micrometers (μm), but are not limited thereto.

Meanwhile, the intaglio part 212 may be implemented in various shapes.

FIGS. 5A to 5D are plan views illustrating portions of a circuit board having an intaglio portion according to various embodiments of the present disclosure.

Figure 5A:
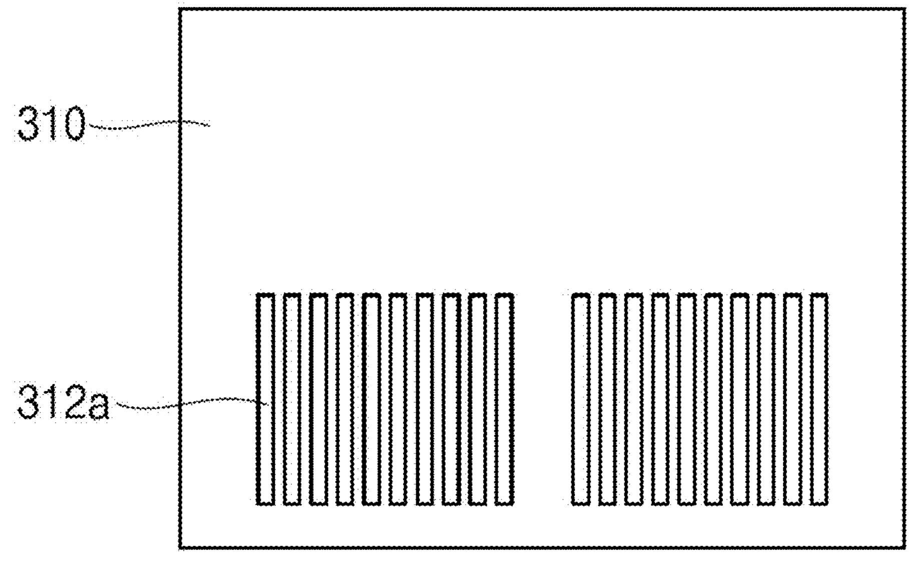
FIGS. 5A to 5D are plan views illustrating portions of a circuit board having an intaglio portion according to various embodiments of the present disclosure.
Figure 5B:
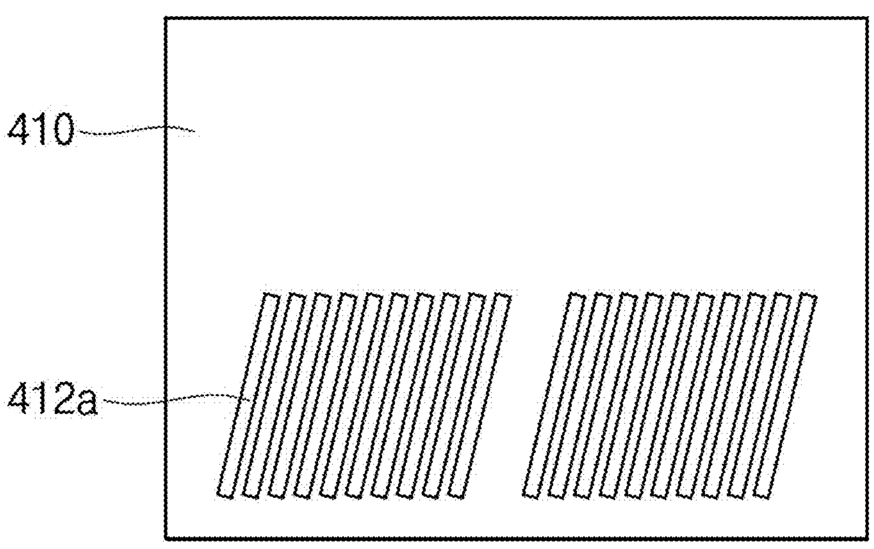
Figure 5C:
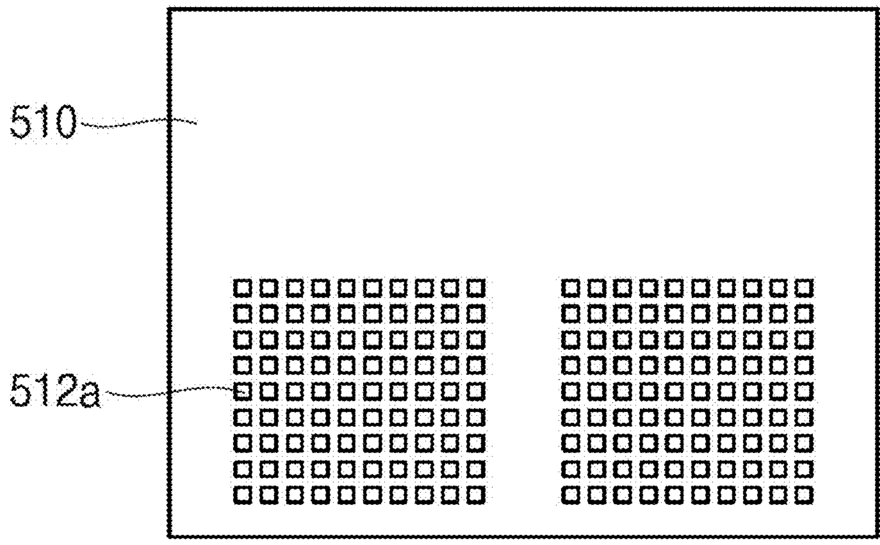
Figure 5D:
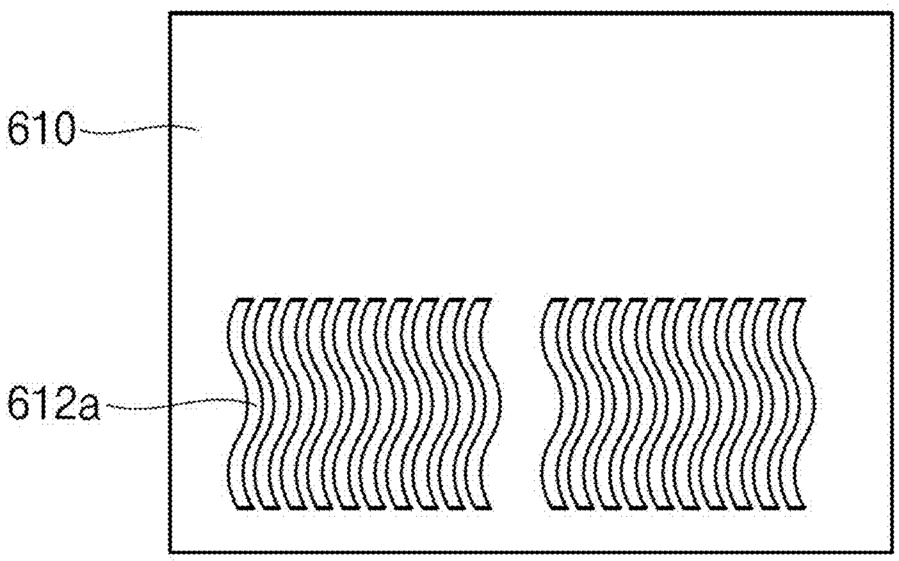

As shown in FIG. 5A, an intaglio part 312*a* may be shaped to have a plurality of straight-shaped holes formed at one side of a circuit board 310 at regular intervals, and a plurality of holes of the same shape formed at the other side spaced apart from the one side. The spacing between the left and right patterns is illustrative only and is not necessarily required. The pattern shape and interval of the intaglio part 312*a* may vary according to the shape of the conductive pattern. In addition, as shown in FIG. 5B, an intaglio part 412*a* may be formed on a circuit board 410 and shaped to have a plurality of diagonal holes formed at regular intervals. be Alternatively, as shown in FIG. 5C, an intaglio part 512*a* may be formed in a lattice shape on a circuit board 510, or as shown in FIG. 5D, an intaglio part 612*a* may be formed in a curved shape on a circuit board 610. The shapes of the intaglio part are provided only by way of example, and are not limited to the above-described shapes.

Referring to the aforementioned structures, the depth of an intaglio part is smaller than the diameters of conductive balls before compression, so that, when an electrode tab and a tab connection part are in contact with each other, stable conduction is enabled within the intaglio part even if the compressed surface is not flat, because the electrode tab and the tab connection part are thin and have a sufficiently low hardness. In addition, contact areas between the electrode tab and an anisotropic conductive film within the region of the intaglio part and between the anisotropic conductive film and the intaglio part of the circuit board may be increased, and thus contact resistance is reduced while the adhesion is improved.

As described above, according to embodiments of the present disclosure, when an electrode tab and a tab connection part are brought into contact with an anisotropic conductive film, conduction of conductive balls can be achieved in an intaglio part of the tab connection part. Therefore, even if the compressed surface is non-uniform, resistance distribution due to height imbalance of the anisotropic conductive film can be minimized to provide stable resistance and electrical connection.

While the foregoing embodiment has been described to practice the present disclosure, it should be understood that the embodiment described herein should be considered in a descriptive sense only and not for purposes of limitation, and various changes in form and details may be made therein without departing from the spirit and scope of the disclosure as defined by the following claims.

What is claimed is:

1. A battery pack comprising:

an electrode assembly and a battery cell, the battery cell comprising a first electrode tab and a second electrode tab electrically connected to the electrode assembly; and a protective circuit module including a circuit board and a tab connector, the circuit board comprising an intaglio concavely formed on one side, the intaglio electrically connected to a conductive pattern formed on a plate surface, the tab connector electrically connected to the first electrode tab and the second electrode tab, respectively, to electrically connect the first electrode tab and the second electrode tab to the circuit board, wherein the tab connector is electrically connected to the circuit board on the intaglio.

2. The battery pack of claim 1, wherein the tab connector comprises an insulation plate and an anisotropic conductive film, the insulation plate including an insulating material disposed between the circuit board and each of the first electrode tab and the second electrode tab, the anisotropic conductive film disposed between the insulation plate and the circuit board, the anisotropic conductive film including a plurality of a plurality of conductive balls.

3. The battery pack of claim 2, wherein an opening is formed through the insulation plate at a position corresponding to the intaglio.

4. The battery pack of claim 3, wherein the intaglio has a planar shape having a preset area.

5. The battery pack of claim 4, wherein the intaglio has a depth of about 30%-80% of the diameter of the conductive balls.

6. The battery pack of claim 4, wherein the opening has a shape corresponding to the shape of the intaglio.

7. The battery pack of claim 4, wherein the thickness of the anisotropic conductive film before compression is greater than the thickness of the insulation plate.

8. The battery pack of claim 3, wherein the intaglio is formed repeatedly in a preset pattern.

9. A battery pack comprising:

a battery cell including an electrode assembly and a first electrode tab and a second electrode tab electrically connected to the electrode assembly; and a protective circuit module including a circuit board, an insulation plate, and a tab connector, the circuit board comprising an intaglio concavely formed on one side, the insulation plate including an insulating material disposed to face one-side surface of each of the first electrode tab and the second electrode tab, and the tab connector disposed between the insulation plate and the circuit board, the tab connector including a plurality of conductive balls, wherein the insulation plate comprises an opening communicating with the intaglio, and wherein the first electrode tab and the second electrode tab are electrically connected to the circuit board in regions of the intaglio and the opening.

10. The battery pack of claim 9, wherein the intaglio is formed repeatedly in a preset pattern.

11. The battery pack of claim 10, wherein the intaglio has a depth of about 30%-80% of the diameter of the conductive balls.

12. The battery pack of claim 9, wherein the intaglio has a curved shape.

13. The battery pack of claim 9, wherein the intaglio has a lattice shape.

14. The battery pack of claim 9, wherein the intaglio comprises a plurality of diagonal holes formed at regular intervals.

15. The battery pack of claim 9, wherein the opening has a shape corresponding to the shape of the intaglio.

* * * * *